US006921234B2

United States Patent
Arvidsson et al.

(10) Patent No.: US 6,921,234 B2
(45) Date of Patent: Jul. 26, 2005

(54) TOOL AND TOOLHOLDER FOR CHIP FORMING MACHINING

(75) Inventors: Peder Arvidsson, Gävle (SE); Jan Johansson, Sandviken (SE); Lars-Erik Enquist, D'oorf (DE)

(73) Assignee: Sandvik AB, Sandviken (SE)

( * ) Notice: Subject to any disclaimer, the term of this patent is extended or adjusted under 35 U.S.C. 154(b) by 43 days.

(21) Appl. No.: 10/250,923

(22) PCT Filed: Jan. 3, 2002

(86) PCT No.: PCT/SE02/00005

§ 371 (c)(1),
(2), (4) Date: Dec. 3, 2003

(87) PCT Pub. No.: WO02/055243

PCT Pub. Date: Jul. 18, 2002

(65) Prior Publication Data

US 2004/0101371 A1 May 27, 2004

(30) Foreign Application Priority Data

Jan. 9, 2001 (SE) .............................................. 0100052

(51) Int. Cl.[7] .............................................. B23B 27/16
(52) U.S. Cl. ...................................... 407/103; 407/113
(58) Field of Search ................................. 407/113, 103, 407/107

(56) References Cited

U.S. PATENT DOCUMENTS

| | | | | |
|---|---|---|---|---|
| 4,437,802 A | * | 3/1984 | Hall, Jr. ....................... | 408/197 |
| 5,810,518 A | | 9/1998 | Wiman et al. | |
| 5,863,162 A | | 1/1999 | Karlsson et al. | |
| 5,924,826 A | * | 7/1999 | Bystrom et al. ............ | 407/103 |
| 6,086,290 A | | 7/2000 | Qvarth et al. | |
| 6,102,630 A | | 8/2000 | Flolo | |
| 6,183,688 B1 | | 2/2001 | Karlsson et al. | |
| 6,244,790 B1 | * | 6/2001 | Kingdom et al. ........... | 407/110 |
| 2003/0077129 A1 | | 4/2003 | Cirino | |

FOREIGN PATENT DOCUMENTS

AU             213 925        12/1957

\* cited by examiner

*Primary Examiner*—Daniel W. Howell
*Assistant Examiner*—SAra Addisu
(74) *Attorney, Agent, or Firm*—Burns, Doane, Swecker & Mathis, LLP

(57) ABSTRACT

An indexible cutting insert has a connecting surface formed by alternating parallel ridges and grooves. Each ridge is defined by a pair of flanks which converge in an outward direction. Each ridge includes a convexly curved surface portion for making line contact with a corresponding ridge of a support surface. The convexly curved surface is spaced from outer and inner ends of the respective flank.

27 Claims, 6 Drawing Sheets

Figure 1:
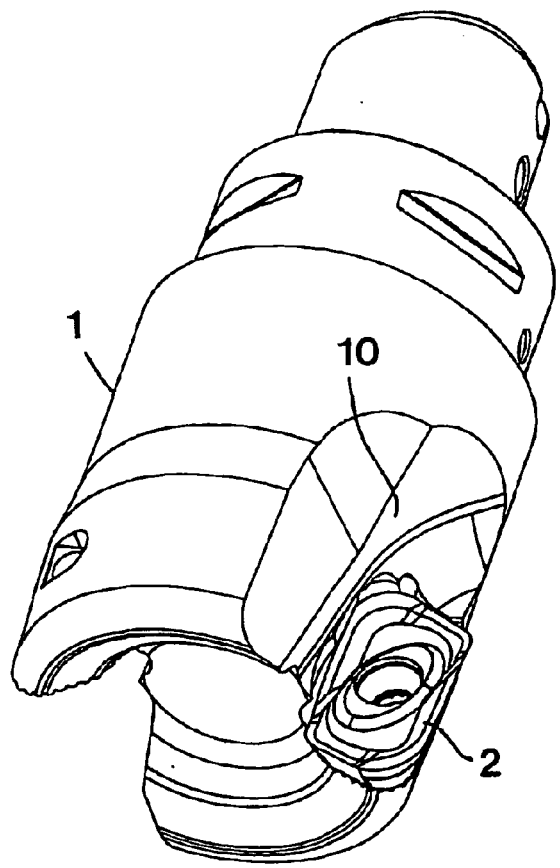

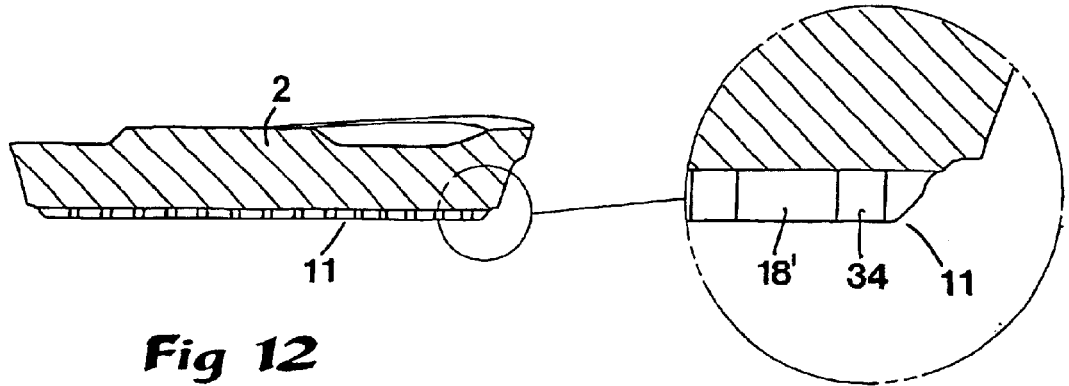
Fig 12
Fig 13
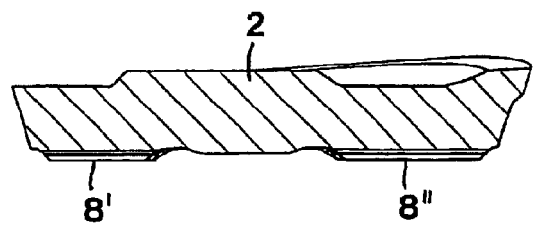
Fig 14
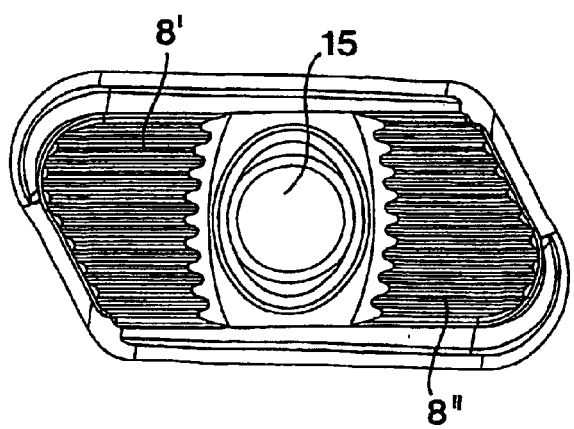
Fig 15

TOOL AND TOOLHOLDER FOR CHIP FORMING MACHINING

TECHNICAL FIELD OF THE INVENTION

In a first aspect, this invention relates to a tool intended for chip removing machining of the type that comprises a holder and a cutting body having a first connecting surface which comprises several first long, narrow ridges spaced-apart via grooves, which ridges are mutually parallel and have a cross-section-wise tapering shape, and which surface is arranged to engage with a second connecting surface of the holder or a part connected to the same, which second surface is formed with similar parallel second ridges and grooves with the aim of achieving rigid fixing of the cutting body in relation to the holder, whereby the individual ridge in the respective connecting surface is delimited by an apex and two opposite flanks, which extend towards spaced-apart bottom spaces in the grooves.

Tools of the above generally mentioned kind are usually used for machining work pieces of metal, such as steel, aluminium, titan, etc. The holder of the tool may either be fixedly assembled, e.g. for turning purposes, or be rotatable, e.g. for milling or drilling purposes. The cutting body constitutes a consumable article having a considerably shorter service life than the holder and is, therefore, detachably connected to the holder in order to permit exchange. The cutting body may be of a highly varying shape, depending on the field of use. A cutting body which frequently occurs consists of flat and polygonal or round cutting inserts of the type which has a top side, at least one side or peripheral surface, and a bottom side, whereby one or more cutting edges are formed in the transition between the top side and the peripheral surface. of the type that has a rotationally symmetrical envelope surface on which cutting edges are formed. Such cutting bodies are found, for instance, in drills, endmills and the like.

It has always been an aim to connect the cutting body with the holder in as stable and reliable a way as possible. Previously, the conventional flat cutting inserts were formed throughout with a flat bottom side, whereby the cutting inserts were assembled in seatings or so-called insert seats having on the one hand a plane bottom against which the bottom side of the cutting insert is pressed, and on the other hand one or more side walls against which the side surfaces of the cutting inserts are pressed. Recently, however, the use of co-operating, connecting surfaces provided with ridges of the type initially mentioned has begun to be adopted in the tool industry.

PRIOR ART

In the patent literature, different embodiments of co-operating, ridged connecting surfaces or so-called serrations are fairly richly described. See, for instance, U.S. Pat. No. 6,102,630 (Tool Flo Manufacturing, Inc.), WO 99/19104 (Sandvik AB), WO 99/19105 (Sandvik AB), WO 97/16276 (Sandvik AB), SE 9702500-1 (Seco Tools AB), AU 213925 (Stanislas Kryszek) and U.S. Pat. No. 5,810,518 (Sandvik AB). In these known constructions, each one of the two co-operating connecting surfaces or serrations comprises a plurality of parallel and long narrow ridges, spaced-apart via grooves, which ridges usually are of a trapezoid-like cross-sectional shape. More precisely, the individual ridge profile is formed with plane or smooth flanks, which form an approximately 60° angle to each other. Furthermore, characteristic of connecting surfaces or interfaces of the kind in question is that the peaks or apexes of the ridges do not bottom in the appurtenant grooves. In this way, it is guaranteed that only the flanks of the ridges are pressed against each other, whereby the ridges are wedged up into each other.

In the modern tool industry, the development is driven in the direction of ever faster cutting operations. In, for example, milling of comparatively soft metals, such as aluminium, the machining may take place with a very high cutting or peripheral speed, e.g. of the order of 10 000 m/min or more. In order to carry out a milling operation at such a cutting speed, a relatively high rotational speed is required in that the milling tools cannot be of an unlimitedly large diameter. Therefore, the demands that are made on tools for high-speed machining differ partly from the demands that are associated with classic chip forming machining, where the cutting force is of dominant importance. Thus, centrifugal and unbalance forces play a central role in high-speed rotating tools, such as milling tools for aluminium machining. An important factor in this respect is the mass of the tool itself; something that implies that the cutting-insert-carrying holders or the milling heads intended for high-speed rotating milling tools to an increasing extent have been made of light materials, such as aluminium.

Investigations forming the basis for the present invention have shown that conventional ridged connecting surfaces of the initially mentioned type, which are based on the use of plane flanks of the ridges as well as an in other respects not very well thought-out geometry, are unsuitable for use in high-speed rotating tools, in particular when said tools comprise comparatively thin, flat cutting inserts. An important circumstance in this context is the difference between theory and practice. Thus, in theory, the flanks of the ridges are ideally plane and positioned at exact angles and locations in relation to each other and the co-operating ridges in a connecting interface. However, in practical manufacturing of the holders and cutting bodies, respectively, of the tools (which is carried out in different places), dimensional deviations may occur, which entail that the contact points or surfaces between the flanks of the ridges are established in an uncontrolled and unsatisfactory way when the connecting surfaces are brought to engagement with each other at the assembly of the cutting body on the holder. Among other things, the actual flank contact may arise "high" up in the connecting interface, i.e. due to the fact that one of the flanks or both of them on one or several of the ridges which are part of the cutting body come into contact with solely the top parts of the flanks of the surrounding ridges, which are part of the connecting surface of the holder. This can, among other things, result in the interface between the cutting body and the holder simply being sheared off because the material in the peaks or apex portions of the holder ridges fails. Furthermore, angular errors may at times arise inasmuch as nearby flanks may get different angles, whereby gaps arise between the same. Minor dividing or form errors may likewise arise. The consequences of uncontrolled and mediocre contact between the ridges may become hazardous when the tool is operated at high rotational speed. For instance, a screw arranged for clamping the cutting body may be exposed to considerable tensile load, and become elongated as a consequence of the ridges in the respective connecting surfaces moving in relation to each other; something which may result in the screw giving away and the cutting body coming loose from the holder and being thrown out with great force as a consequence of the centrifugal force. It may also occur that the ridges in the usually hard material of the cutting body crack.

Another disadvantage of tools having connecting surfaces of the previously known type is that the bottom spaces of the individual grooves of the connecting surface of the cutting body are comparatively deep and have an inappropriate geometry. This implies limited possibilities to form such connecting surfaces on comparatively thin, flat, and thereby light cutting inserts of the type that is desirable for use in high-speed rotating milling tools. Among other things, there is a considerable risk that the cutting inserts disintegrate or crack if the grooves are too deep in relation to the thickness of the cutting inserts.

Aims and Features of the Invention

In a first aspect, the present invention aims at providing a tool intended for chip forming or chip removing machining, having an improved connecting interface between the holder of the tool and a cutting body detachably connected thereto. Therefore, a primary aim of the invention is to provide a tool having a connecting interface which has high precision, more precisely by ensuring a controlled and reliable contact between the flanks of co-operating ridges independently of such minor dimensional deviations that in practice may arise in serial production of the tool. The connecting interface should, in this connection, endure extremely high mechanical loads as well as permit a stable and well-defined fixing of the cutting body on the holder. A further aim is to provide a tool having a connecting interface which enables production of comparatively thin cutting inserts without the same running an obvious risk of disintegrating or cracking during use. The geometry of the connecting interface should, among other things, not cause considerable tensile stresses in the material of the cutting body. Yet another aim of the invention is to provide a tool, the cutting body of which may be fixed in an exact way without the connecting surfaces necessarily needing to be ground.

According to the invention at least the primary aim is attained by means of a tool for chip removing machining which comprises a holder and a cutting body. The cutting body has a first connecting surface which comprises a plurality of first long, narrow ridges spaced apart by grooves. The ridges are mutually parallel and each ridge has an apex surface and two opposite flanks extending from the apex surface toward the bottoms of respective adjacent grooves. Each ridge has a cross-section which becomes narrower toward the apex surface. At least one of the flanks of each ridge has a convexly curved portion extending along a part of such flank. The holder has a second connecting surface formed by parallel ridges alternating with grooves. The ridges of the first connecting surface mesh with grooves of the second connecting surface. A crest of each convexly curved portion makes substantially linear contact with a respective ridge of the second connecting surface.

In a second aspect, the invention relates to a cutting body as such. The basic features of the cutting body according to the invention includes a cutting edge, and a connecting surface. The connecting surface includes parallel ridges which alternate with grooves. Each ridge has a cross-section which narrows toward an apex surface disposed at a free outer end thereof. Each ridge comprises a pair of flanks which converge to the apex surface of the ridge. At least one of the flanks has a convexly curved portion extending along only a part of the flank.

Further Elucidation of Prior Art

In SE 9404266-0 (Seco Tools AB), a so-called cutting-off tool is described, having a cutting insert which may be assembled in the tool holder via connecting surfaces or serrations of the type that comprise a plurality of parallel ridges spaced-apart via grooves. In this case, the ridges and grooves of the connecting surface of the holder have a trapezoidal profile, while the ridges and grooves of the connecting surface of the cutting insert are defined by a sine curve. This implies that the individual ridge of the cutting insert has a cross-section-wise convexly curved shape merely in the outer, free apex part thereof, while the inner half or root part of the ridge is delimited by concavely curved flank surfaces. Therefore, contact between a ridge of the cutting insert and two surrounding ridges of the holder may only be established along the apex parts of the holder ridges; something which implies that the contact lines or surfaces will be located "high" in the appurtenant grooves of the holder. Furthermore, the space between, on the one hand, the bottom of the individual groove of the cutting insert, and on the other hand the apex of the individual groove of the holder becomes large. For these reasons, the connecting interface described in SE-9404266-0 is not suited for use in flat, comparatively thin cutting inserts intended for high-speed rotating tools. It should here be mentioned that the tool according to said publication is fixedly assembled, and that the cutting insert is of a considerable thickness (=the distance between the top and bottom sides of the cutting insert).

In WO 98/19831 (Seco Tools AB), a rotatable cutting tool is described, having a detachable cutting head, which is connected to a holder in the form of a shaft via four X-shaped oblique ridges which engage in a corresponding number of oblique grooves in the end of the shaft. Each such groove has a trapezoidal profile, while the cooperating ridge of the cutting head has generally convexly curved flanks. More precisely, the curve of the flanks is defined by a radius that is only slightly greater than the height of the ridge. However, also in this case the contact lines between the convex flanks of an individual ridge and the plane flank surfaces of a co-operating groove are located high in the groove; something which results in that the joint between the cutter head and the shaft may become unstable and unreliable. Furthermore, the ability of the connecting interface to accept dimensional deviations from the production process is extraordinarily limited.

BRIEF DESCRIPTION OF THE APPENDED DRAWINGS

In the drawings

Figure 2:
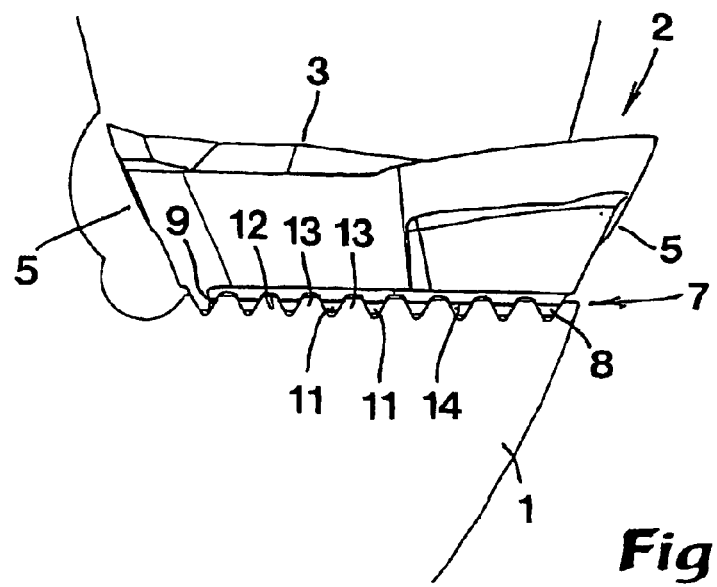
Figure 3:
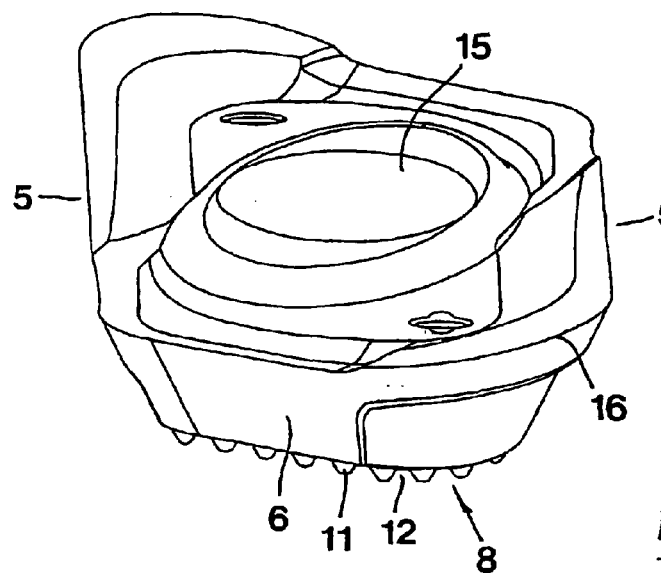
Figure 4:
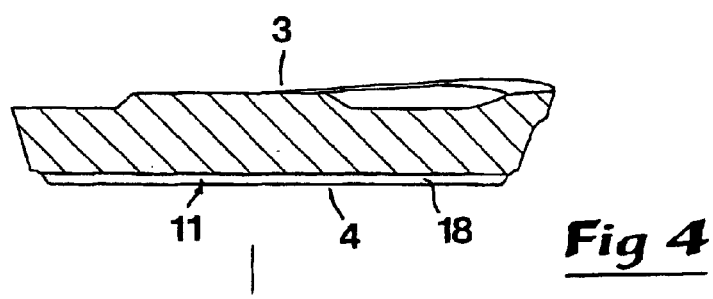
Figure 5:
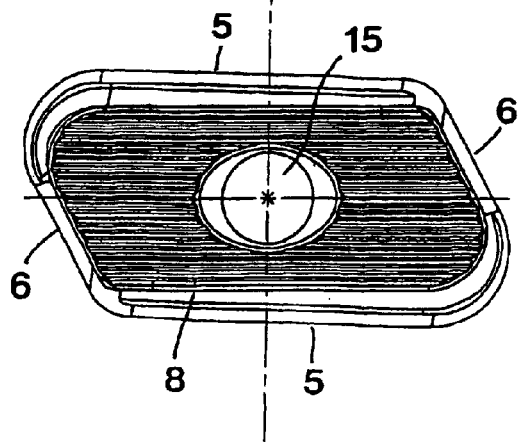
Figure 6:
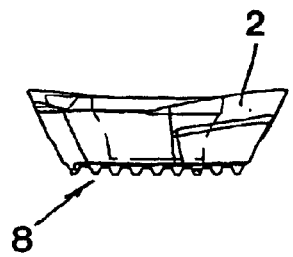
Figure 7:
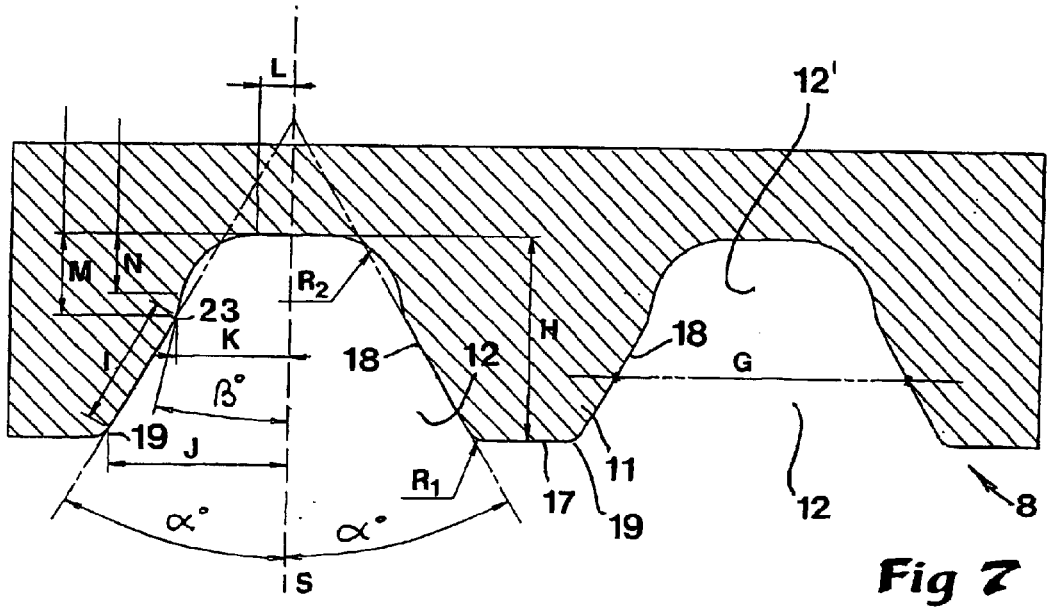
Figure 8:
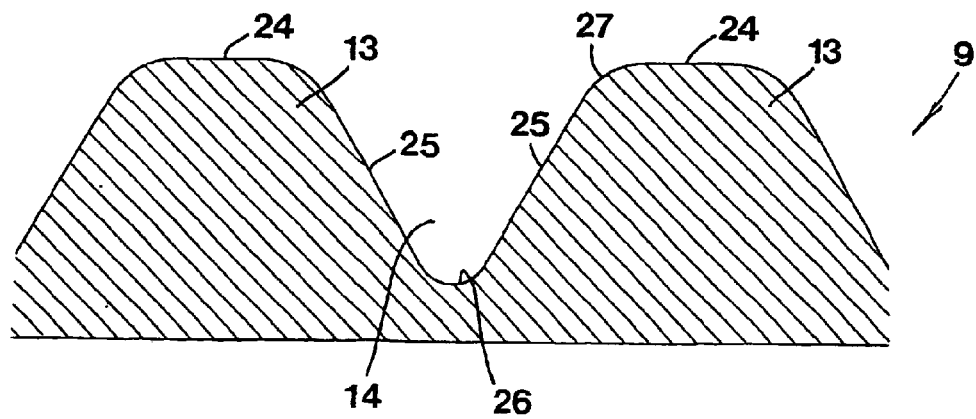
Figure 9:
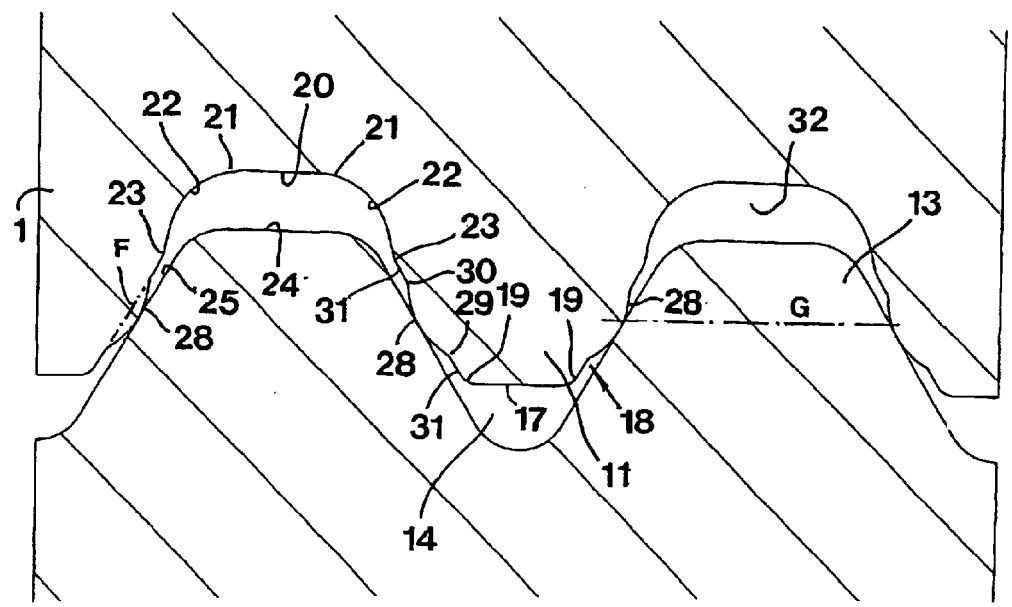
Figure 10:
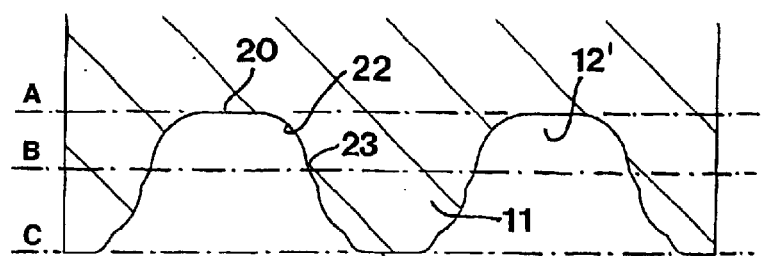
Figure 11:
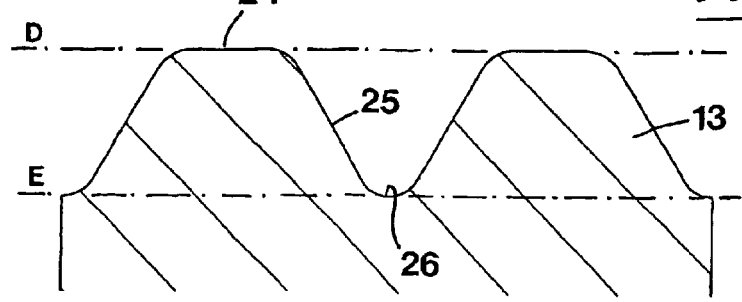
Figure 16:
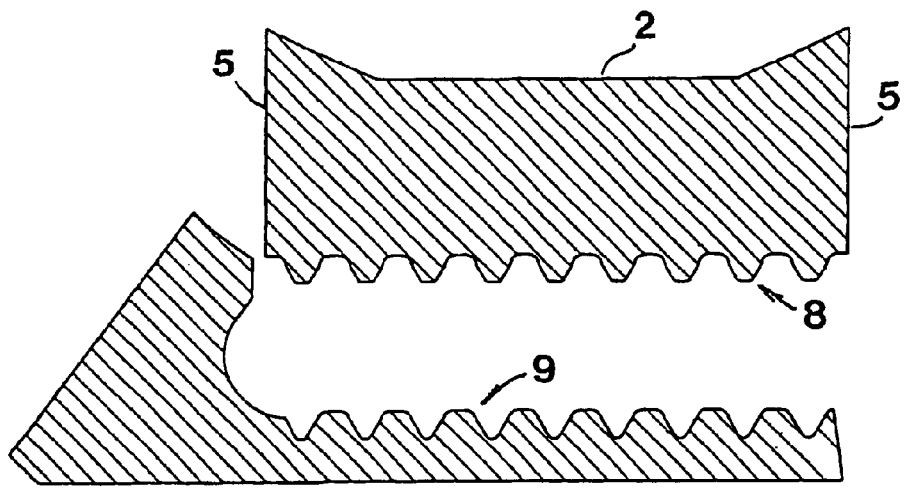
Figure 17:
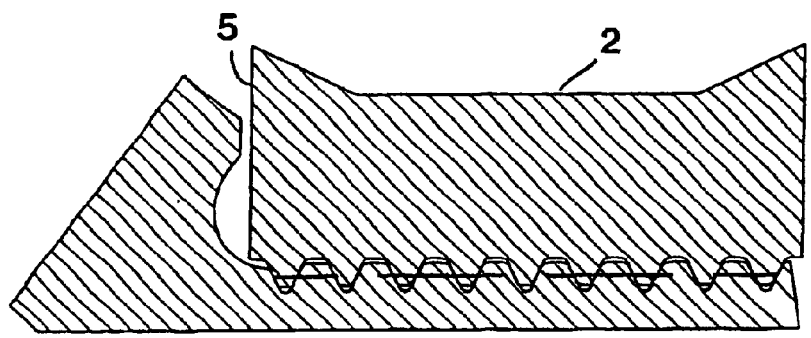
Figure 18:
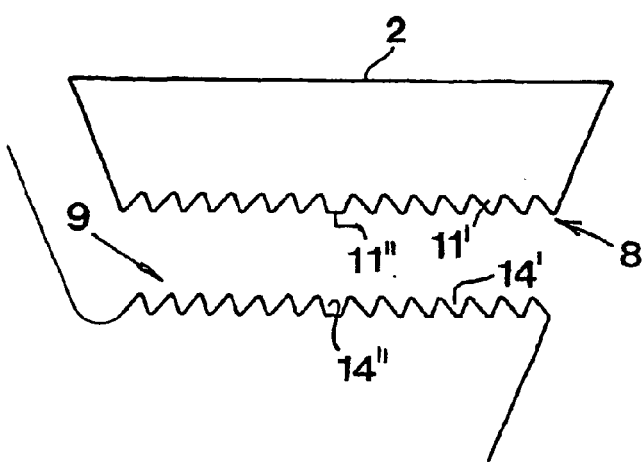

FIG. 1 is a perspective view of a cutting tool having a cutting body in the form of a flat cutting insert and a holder in the form of a cutter head, FIG. 2 is an enlarged, partly sectioned side view showing the cutting insert from an end of the cutter head, FIG. 3 is a perspective view of solely the cutting insert itself as seen obliquely from above, FIG. 4 is a longitudinal view through the same cutting insert, FIG. 5 is a planar view from below of the cutting insert showing a connecting surface comprised in the cutting insert, FIG. 6 is an end view of the same cutting insert, FIG. 7 is a very enlarged cross-section showing the profile shape of a first connecting surface comprised in the cutting insert, FIG. 8 is an analogous cross-section showing the profile shape of a second connecting surface comprised in the cutter head, FIG. 9 is a cross-section showing the connecting surfaces in engagement with each other, whereby the flanks of the ridges in the first connecting surface are illustrated with exaggeratedly curved surfaces, FIG. 10 is a cross-section showing solely the first connecting surface according to FIG. 9, although on a reduced scale, FIG. 11 is an analogous cross-section illustrating the profile shape of the second connecting surface, FIG. 12 is a longitudinal section, corresponding to FIG. 4, through a cutting insert according to an alternative embodiment of the invention, FIG. 13 is an enlarged segment of FIG. 12, FIG. 14 is a longitudinal section through a cutting insert according to an additional embodiment of the invention, FIG. 15 is a planar view from below of the cutting insert according to FIG. 14, FIG. 16 is a cross-section showing an alternative embodiment of a cutting insert, which is separated from the appurtenant holder, FIG. 17 is a cross-section showing the cutting insert according to FIG. 16 in engagement with the holder, and FIG. 18 is an exploded view showing an alternative embodiment of a connecting interface between a cutting insert and a holder.

DETAILED DESCRIPTION OF PREFERRED EMBODIMENTS OF THE INVENTION

In FIGS. 1 and 2, numeral 1 designates a holder in the form of a milling head, which is part of a tool for chip removing machining. On said milling head, a plurality of cutting inserts are assembled, one of which is shown with the general reference designation 2. Although the geometry of said cutting insert may be fairly complicated, in particular on the topside of the cutting insert, the cutting insert consists of a flat cutting insert of the type, which has a comparatively limited thickness in relation to other dimensions. In FIGS. 2–6, numerals 3, 4 designate the top and bottom sides of the cutting insert, while 5, 6 designate two different types of peripheral sides, viz. long sides and short sides, respectively. Thus, in the example, the cutting insert is generally polygonally shaped. In round cutting inserts, only a single, circumfering side surface is found.

The cutting insert 2 is connected to the cutter head via an interface or a connecting interface, in its entirety designated 7, which comprises two different, ridged connecting surfaces, viz. a first connecting surface 8 on the bottom side of the cutting insert 2, and a second connecting surface 9, which in this embodiment is formed directly in the milling head 1. More precisely, said connecting surface 9 forms a bottom in a chip space 10, formed in the milling head, and in which the cutting insert is housed. The first connecting surface 8 comprises a plurality (e.g. 8 to 10) of ridges 11, which are spaced-apart by flutes or grooves, designated 12. The second connecting surface 9 (see also FIGS. 7 and 8) is correspondingly formed having a plurality of ridges 13, which in turn are spaced-apart by grooves 14, in which the ridges 11 engage. Henceforth, the ridges 11 will be designated first ridges, while the ridges 13 will be designated second ridges. In an analogous way, the grooves 12 will be designated first grooves, while the grooves 14 will be designated second grooves.

It should already now be mentioned that the cutting insert may also be assembled on a particular shim or in a cassette. In such cases, a homologous, ridge-provided connecting surface is provided, at least on one side of the shim and the cassette, respectively. Advantageously, ridged connecting surfaces are formed on opposite sides of said shims and cassettes, respectively. In other words, the cutting insert may be assembled on a supplementary unit instead of directly on the carrying holder of the tool.

The cutting insert 2 is usually produced in a material, which is considerably harder than the material of the holder 1. The cutting insert may, within the scope of the invention, be made of many different, hard materials, such as conventional cemented carbide, ceramics, cermet or the like. So-called tips, in the form of small bodies of e.g. cubical boron nitride, polycrystalline diamond, etc., exposed in the cutting edges may also be included in the cutting insert. The material of the cutting insert 2 may have a modulus of elasticity within the range of 270–800 GPa. The material of the holder 1, however, may have a considerably lower modulus of elasticity, e.g. within the range of 60–250 GPa (and a yield point in tension within the range of 200–1400 MPa). Usually, steel or aluminium is used as material in the holder. Thus, the material of the holder is generally considerably softer and more inclined to deformation than the material of the cutting insert.

In FIG. 5, it may be seen that the cutting insert 2 comprises a central hole 15 for a screw (not shown) by means of which the cutting insert may be fixed in an appurtenant so-called insert seat, i.e. on said second connecting surface 9. Furthermore, in FIG. 3 it may be seen how cutting edges 16 are formed in the transition between the topside and side surfaces of the cutting insert, e.g. by grinding. It should also be mentioned that the ridges and the grooves, respectively, in the two co-operating connecting surfaces 8, 9 have a generally tapering profile or cross sectional shape and are parallel in relation to each other.

Reference is now made to FIGS. 7–11, which illustrate in more detail the essence of the invention, viz. the forming of the ridges and grooves in the two co-operating connecting surfaces 8, 9, which form the interface 7 between the holder 1 and the cutting insert 2.

Each individual ridge, which forms part of the two connecting surfaces, is delimited by an apex or apex surface and two flanks, which extend from the apex towards the bottom spaces of nearby grooves. The apex of each individual first ridge 11 is designated 17, while each one of two opposite flanks is generally designated 18. In the illustrated, preferred embodiment, the apex 17 is formed by a plane surface, which along opposite, parallel long-side edges transforms into the flanks 18, via transitions 19, which below are denominated outer transitions (of the flanks), and which advantageously have the shape of convexly rounded edge surfaces, where the rounding has a small radius $R_1$ (e.g. 0.05 mm). The bottoms or bottom spaces of each one of the two first grooves 12, which are situated on both sides of each individual first ridge 11 are designated 12' (see FIGS. 7 and 10) Each such bottom space is delimited by a bottom surface 20 (see FIG. 9), which along opposite, parallel long-side edges (marked as 21) transforms into side surfaces 22, having a concavely curved shape. In the area between the individual flank 18 and the appurtenant bottom side surface 22, there is a transition designated 23, which forms an inner transition for the flank.

In the example according to FIGS. 7–11, the bottom surface 20 is plane. However, it is also feasible to form said bottom surface with a concavely curved shape, whereby the curved shape is determined by another, and larger, radius, than the radius of the curved side surfaces 22. The bottom surfaces 20 of all first grooves are located in a common plane A (see FIG. 10). In an analogous way, the inner transitions 23 of the flanks 18 are located in a common plane B. Said plane B is parallel to the plane A. Also, the apex surfaces 17 of the first rides 11 are located in a common plane, denominated C. Said plane C is parallel to the plane A, as well as the plane B. The bottom space 12' mentioned above consists of the space in the individual groove which is found between the planes A and B.

The apexes and flanks of the individual ridges 13, which are comprised in the second connecting surface 9 are designated 24 and 25, respectively, and the surfaces which form the bottom surfaces of the second grooves 13 being designated 26. Each such bottom surface 26 consists in the shown example of a concavely curved or curved surface, although a combination of plane surfaces and concavely curved side surfaces is also feasible. In the example, each flank surface 25 transforms directly into a concavely curved bottom surface 26. The individual flank surface 25 transforms at the outer limiting edge thereof into the apex surface 24 via convexly curved outer transitions 27. The radius of said transitions 27 is limited (in the example to 0.15 mm).

In the shown example, the apex surfaces 24 are plane, although they could also be curved, preferably convexly curved. The apex surfaces of all the second ridges 13 are situated in a common plane D (see FIG. 11), which is parallel to a plane E, in which the bottom surfaces 26 of all second grooves 14 are located. The perpendicular distance between the planes D and E defines the depth of the individual second groove 14.

In the preferred embodiment shown, the flanks 25 of the second ridges 13 are in the shape of plane surfaces.

Reference is now made to FIG. 7 and the ridges 11, which form part of the first connecting surface 8. In previously known, conventional cutting bodies, which feature ridged connecting surfaces, the flanks of the individual ridge usually have had the shape of plane surfaces in the same way as the flanks of the co-operating ridges which form part of the second connecting surface 9 of the interface. This fact gives rise to the problems and difficulties which have been referred to initially. In theory, the flank angle (i.e. the angle of two flanks of the same ridge) of each first ridge, corresponds to the flank angle of two surrounding ridges in the second connecting surface. For many different reasons, said flank angle is in practice most often chosen to be 60° (=2α°, where α is 30°). It is easy to realize that the flanks of the co-operating first and second ridges in the interface obtain an approximately complete surface contact along the entire depth extension I thereof (=the distance between the inner and outer transitions to the apex and the bottoms, respectively), in the case where all nominal dimensions would be achieved. Vital dimensions in this respect are, apart from the proper flank angle, the pitch between neighbouring ridges in each one of the two connecting surfaces, the volume (depth and width) of the individual ridge, and the symmetry of the individual ridge around the symmetry plane thereof. However, at practical manufacture of the cutting inserts and the holder of the tool, respectively, the prescribed dimensional tolerances are not always consequently and consistently attained. Thus, off and on, dimensional deviations appear during serial production. Said dimensional deviations do not need to be so large that they require scrapping of the cutting inserts and the holders, respectively, yet they contribute to the actual contact between the flanks of co-operating ridges ending up on different points of the boundary between the flanks in an uncontrolled way.

In order to solve the above-mentioned problem, at least one of the two flanks 18, delimiting a first ridge 11, has—according to the invention—been formed with a convexly curved surface portion 28. Said curved surface portion has such a large radius and limited arc height that the same is invisible to the naked eye in FIG. 7. Therefore, in order to elucidate the general idea according to the invention, such surface portions 28 are shown having a very exaggerated arc height in FIGS. 9–10. Each convexly curved surface portion 28 forms a crest and is delimited by outer and inner limiting edges, designated 29, 30, which extend axially along the individual ridge, and are mutually parallel. To the left in FIG. 9, is shown a chord F for the circular arc that defines the surface portion 28.

In the example according to FIGS. 9–11, the curved surface portion 28 is narrower than the flank itself, i.e. the distance between the limiting edges 29 and 30 (=the length of the chord F), is smaller than the width or extension I of the flanks 18 (=the distance between the transitions 19 and 23). In other words, two plane surfaces 31 are in this case formed on both sides of the curved surface portion 28. In this context, it should, however, be emphasized that the curved surface portion 28 in practice also can have the same width as the flank itself, i.e. the flank 18 is in its entirety formed by a convexly curved surface.

The functions and the benefits of the convexly curved surface 28, which entirely or partly forms a flank of the individual first ridge, are to be seen below.

When the two connecting surfaces are brought into engagement with each other, the individual surface 28 is pressed against a co-operating, plane flank surface 25 of the second ridge 13. Theoretically, linear contact is hereby obtained between the surfaces 28, 25, i.e. contact is established along a line which extends axially along the respective surface. In FIG. 9, said contact line is schematically illustrated in the plane G. Said theoretical contact line is at a level situated in an area approximately halfway between the limiting edges 29, 30, or the transitions 19, 23. This means that the convexly curved surface portion 28 extends inwards as well as outwards from the theoretical contact line G. In this context, it should be remembered that the material of the holder 1, i.e. the material of every second ridge 13, is softer than the material of the cutting insert.

Suppose that a minor deviation in the flank angle of, for example, a second ridge 13 would arise, e.g. inasmuch as the flank angle of the second ridge would become somewhat (utmost insignificantly) more acute than the nominal angle 60°. In that case, the theoretical contact line G is established closer to the limiting edges 30 and the inner transitions 23, respectively, than is shown in FIG. 9. Conversely, it is a fact that the contact line G is moved closer to the limiting edge 29 or the transition 19 if the actual flank angle would be somewhat more obtuse than 60°. Naturally, analogous conditions are true if the flank surface of each first ridge 11 would deviate from the desired nominal angle. Expressed in other words, the curved surface 28, which extends inwards as well as outwards from the theoretical contact line G, enables the opposite flank to "roll off" towards the surface in question.

The actual contact between the respective ridges has, however, the form of a surface contact. When the cutting insert is assembled in the holder and pressed against by a certain force, e.g. by means of a fixing screw or a clamp, the softer material of the ridges 13 will be deformed, above all elastically, at least so much that surface contact will be attained along a major section of the curved surface 28.

The fact that the deformation of the material of the ridges 13 is of an elastic character implies that the flanks 25, in all essentials, resume the plane shape thereof, when the ridges 11 are removed from the grooves 14.

Also with other dimensional deviations than angle deviations, e.g. pitch errors, the curved surfaces of the flanks guarantee that reliable surface contact is attained along at least a certain part of the flanks.

In the shown embodiment, which relates to a flat and comparatively thin cutting insert of the type which advantageously is used in high-speed rotating tools, the cutting insert may be formed with an effective and well-defined connecting surface, without jeopardizing the strength properties of the cutting insert. Through the truncated geometry, obtained by means of the plane bottom surface 20 of the individual first ridge 12, the cutting insert may be dimensioned with an optimal quantity of material despite limited overall thickness. Thus, the depth H (see FIG. 7) of the ridges 11 and grooves 12, respectively, such as this is defined by the distance between the planes A and C according to FIG. 10, may amount to, at most, 20%, suitably 3–15%, of the thickness of the cutting insert, counted as the perpendicular distance between the top side 3 of the cutting insert (the highest point of the top side), and the bottom side of the first connecting surface 8, such as this is represented by the apexes 17 of the ridges 11. In absolute dimensions, the individual first ridge 11 may have a depth (the distance between the planes A and C) which amounts to, at most, 0.6 mm. Thereby, the individual flank 18 of the ridge may have a width, or extension I, between the outer and inner transitions thereof, 19, 23, within the range of 0.25–0.40 mm, suitably 0.30–0.37 mm.

According to a preferred embodiment of the invention, the curved surface portion 28 of the individual flank 18 of each first ridge, has an arc height which amounts to 0.5–5% of the length of the conceived chord F. In this context, it should be reminded that the flank 18 may be convexly curved in its entirety. Thus, if the width of the flank amounts to 0.30 mm (=the length of the chord F), the arc height may vary within the range 0.0015–0.015 mm. The radius of the curved surface 28 may be within the range of 1–15 mm, suitably 3–6 mm.

In FIG. 10 it can be seen how the bottom space 12' of the individual first groove 12 has a depth (counted as the perpendicular distance between the planes A and B), which is smaller than the depth of the outer section of each first ridge 11, (the distance between the planes B and C) The depth of the bottom space 12' should be less than 40% of the total depth of the ridge 11 (=the distance between the planes A and C).

When the cutting insert is assembled and the two connecting surfaces 8, 9 are in engagement with each other, a free space 32 is formed between the apex surfaces 24 of the second ridges 13 and the bottom spaces 20 of the grooves 12 (see FIG. 9). The height of said space 32, i.e. the perpendicular distance between the bottom surface 20 and the apex surface 24, should amount to at most 20% of the total depth H of the first ridge 11.

Below concrete examples of dimensions of the cutting insert illustrated in FIG. 7 will follow, which are especially suited for high-speed rotation milling. The cutting insert may have a width within the range of 10–12 mm, and a thickness of approximately 5-mm. The spacing between nearby grooves may then amount to 1.25 mm, whereby the individual ridge has a depth H of 0.54 mm. The angle α amounts to 30° (2α=60°). The width I of the curved flank 18 amounts to 0.35 mm, whereby the distance J between a central symmetry line S and the outer transition 19 of the flank 18 amounts to 0.47 mm. The distance K between the symmetry line S and the inner transition of the flank amounts to 0.30 mm. The radius $R_1$ of the outer flank transition 19 amounts to 0.05 mm. The radius $R_2$ of the bottom side surface 22 amounts to 2.00 mm. The plane bottom surface 20 has a width of 0.18 mm (the dimension L=0.09 mm). Between the inner transition 23 of the individual flank 18 and the curved bottom side surface 22, a plane surface portion (no designation), is situated, having a width of 0.06 mm (=the difference between the depth M of the bottom space 12', which amounts to 0.22 mm, and the depth N of the bottom side surface 22, which amounts to 0.16 mm), and is inclined at an angle β=12°.

In the embodiment described above, the curved flank 18 (or, the curved surface portion thereof), extends along the entire length of the first ridge 11, as outlined in FIG. 4. In FIGS 12 and 13, an alternative embodiment is illustrated, in which the convexly curved flank of the individual first ridge 11 is interrupted, i.e., it comprises a plurality of convexly curved surface portions 18', spaced-apart axially along the ridge, between which countersunk surface portions 34 are located. Said countersunk surface portions may, for instance, be plane. In the production of a cutting insert having such ridges, the countersunk surface portions 34 are formed in connection with the compression moulding. Not solely said countersunk surface portions, but also the curved surface portions, may, per se, remain unground, but in practice, grinding of the curved portions is preferred, more precisely by precision grinding. Thanks to the countersinks 34, the total area of the curved surface portions of the ridges is reduced, whereby the grinding operation is facilitated to a large extent.

In this context, it should be pointed out that also the previously described curved flank surfaces, which extend along the entire length of the ridges, may be precision-ground.

Reference is now made to FIGS. 14 and 15, which illustrate how a cutting insert 2 may be formed with several, more precisely two, connecting surfaces 8', 8". Said two spaced-apart connecting surfaces may co-operate with either two separate second connecting surfaces of the appurtenant holder, or with one and the same second connecting surface. In the example according to FIGS. 14 and 15, the cutting insert is formed with a central hole 15, whereby the two connecting surfaces 8', 81" are formed on both sides of said hole. The advantage of forming such a cutting insert with spaced-apart connecting surfaces, is that the cutting insert may be produced by a compression-moulded and sintered material, such as cemented carbide, without risking that shape deviations in the ridges of the connecting surfaces arise in connection with the hole, when the material is sintered.

Irrespective of the embodiment, the curved surface portions of the ridge flanks may, as mentioned above, advantageously be precision-ground, although it is feasible to, with refined techniques, achieve the requisite precision already in connection with compression-moulding and sintering processes (i.e. the surfaces are left unground).

Reference is now made to FIGS. 16 and 17, in which a cutting insert 2 is shown, which differs from the earlier described cutting inserts only in that the same has neutral cutting geometry. However, in FIG. 17, a benefit won by the invention is particularly apparent, viz. that the side surfaces of the cutting insert, e.g. a side surface 5, do not need to be in contact with a side surface of the insert seat. Thus, the connecting interface according to the invention between the cutting insert and the holder ensures a very reliable fixing of the cutting insert. This implies that the cutting insert does not need any lateral support.

In the embodiments described above, the individual ridge (the first one as well as the second one) is symmetrical inasmuch as the two halves of the ridges on both sides of a central symmetry line are identical, although mirror-inverted. In FIG. 18, an alternative embodiment is illustrated, according to which the majority of the ridges are unsymmetrical. More precisely, all ridges 11', apart from a central ridge 11", of the connecting surface 8 of the cutting insert 2, are inclined insofar as that the flanks of the individual ridge has different angles in relation to a straight line, passing through the apex, which is perpendicular to the plane of the cutting insert. Contrary to the saw tooth-like profile shape of the ridges 11', the central ridge 11" has a trapezoid profile shape. In other words, the shape of at least one ridge deviates from the shape of the other ridges. As a consequence of this, the cutting insert can only be assembled solely in one single, predetermined way in the connecting surface of the holder (observe that the central groove 14" has the same trapezoid shape as the ridge 11", and the other grooves 14' having a shape which corresponds to the profile shape of the ridges 11').

Feasible Modifications of the Invention

Although the invention above has been disclosed in connection with an embodiment example in which at least one flank of each first ridge comprised in the cutting insert or the cutting body is formed with at least one curved surface portion, also the opposite embodiment is feasible. In other words, the flanks of the ridges of the second connecting surface, i.e. the connecting surface of the holder, may be made with convexly curved surfaces, while the flanks of the first ridges, which are included in the connecting surface of the cutting insert, are plane. A combination of curved flank surfaces of the first, as well as the second, ridges are likewise feasible. Thereby, it is even possible to form the flanks of the ridges of the holders with concavely curved surfaces. Furthermore, the material hardness of the cutting body and the holder, respective, (and possible shim plates or cassettes) may vary most considerably. Thus, the materials may even be equally hard.

What is claimed is:

1. Tool for chip removing machining, comprising a holder and a cutting body; the culling body having a first connecting surface comprising a plurality of first long, narrow ridges spaced-apart by grooves, the ridges being mutually parallel and each having an apex surface and two opposite flanks extending from the apex surface toward the bottoms of respective adjacent grooves, each ridge having a cross-section becoming narrower toward the apex surface; at least one of the flanks of each ridge having a convexly curved portion extending along a part of such flank; the holder having a second connecting surface formed by parallel ridges alternating with grooves; the ridges of the first connecting surface meshing with grooves of the second connecting surface; wherein a crest of each convexly curved portion makes substantially linear contact with a respective ridge of the second connecting surface.

2. Tool according to claim 1 wherein the convexly curved portion defines an arc height in the range of 0.05–5% of a length of an imaginary chord extending between ends of the convexly curved portion.

3. Tool according to claim 1 wherein the convexly curved portion extends along an entire extent of its respective flank.

4. Tool according to claim 1 wherein the bottom of each groove of the first connecting surface comprises a bottom surface and two concavely curved surfaces disposed at respective ends of the bottom surface.

5. Tool according to claim 4 wherein one end of the concavely curved portion is spaced from the apex surface of the respective ridge; another end of the concavely curved portion being spaced from the bottom of an adjacent groove.

6. Tool according to claim 4 wherein each concavely curved surface intersects a flank of a respective ridge to define an inner transition; wherein each groove of the first connecting surface has two inner transitions, wherein a distance between the bottom surface and an imaginary plane interconnecting the two transitions defines a bottom depth which is less than a distance from the plane to the apex surface of an adjacent ridge of the first connecting surface.

7. Tool according to claim 6 wherein the bottom depth is less than 40% of a ridge depth of the adjacent ridge defined by a distance between the groove's bottom surface and the apex surface of the adjacent ridge.

8. Tool according to claim 7 wherein each ridge of the second connecting surface includes an apex surface spaced from a bottom surface of a respective groove of the first connecting surface by a distance no greater than 20% of the ridge depth of the ridge of the first connecting surface.

9. Tool according to claim 8 wherein the cutting body comprises a replaceable insert, the insert including a top side, a bottom side, and a peripheral side structure interconnecting the top and bottom sides; the first connecting surface formed in the bottom side; the insert including at least one cutting edge formed at a transition between the top side and the peripheral side structure; the ridge depth being no more than 20% of a thickness of the insert measured between the top and bottom sides.

10. Tool according to claim 9 wherein the ridge depth is between 3–15% of the thickness of the insert.

11. Tool according to claim 8 wherein the ridge depth is no greater than 0.6 mm, wherein a distance between the imaginary plane and the apex surface is in the range of 0.25–0.4 mm.

12. Tool according to claim 11 wherein the distance between the imaginary plane and the apex surface is in the range of 0.30–0.37 mm.

13. Tool according to claim 1 wherein the cutting body includes a central through-hole extending through the first connecting surface.

14. Tool according to claim 1 wherein the first connecting surface includes differently shaped ridges and differently shaped grooves.

15. Tool according to claim 1 wherein each ridge of the first connecting surface comprises ridge portions spaced apart along an extension of the ridge to define an interrupted ridge.

16. Cutting body for chip removing machining comprising a cutting edge, and a connecting surface; the connecting surface including parallel ridges alternating with grooves; each ridge having a cross-sectional shape narrowing toward a free outer end thereof; each ridge comprising a pair of flanks converging to an apex surface of the ridge; at least one of the flanks has a convexly curved portion extending along only a part of the flank.

17. Cutting body according to claim 16 wherein the convexly curved portion defines an arc height in the range of 0.5–5% of a length of an imaginary cord extending between opposite ends of the convexly curved portion.

18. Cutting body according to claim 16 wherein the convexly curved portion extends along an entire extent of the respective flank.

19. Cutting body according to claim 16 wherein each groove comprises a bottom, each bottom including a bottom surface and two concavely curved surfaces disposed at respective ends of the bottom surfaces.

20. Cutting body according to claim 19 wherein each concavely curved surface intersects a flank of a respective ridge to define an inner transition; each groove having two inner transitions, wherein a distance between the bottom surface and an imaginary plane interconnecting the two transitions defines a bottom depth which is less than a distance from the plane to the apex surface of an adjacent ridge.

21. Cutting body according to claim 16 wherein the cutting body comprises a replaceable insert, the insert including a top side, a bottom side, and a peripheral side structure interconnecting the top and bottom sides; the connecting surface formed in the bottom side; the cutting edge formed at a transition between the top side and the peripheral side structure; a depth of the ridge being no more than 20% of a thickness of the insert measured between the top and bottom sides.

22. Cutting body according to claim 21 wherein the ridge depth is between 3–15% of the thickness of the insert.

23. Cutting body according to claim 16 wherein the ridge depth is no greater than 0.6 mm, wherein a distance between the imaginary plane and the apex surfaces is in the range of 0.25–0.4 mm.

24. Cutting body according to claim 23 wherein the distance between the imaginary plane and the apex surface is in the range of 0.30–0.37 mm.

25. Cutting body according to claim 16 including a central through-hole extending through the connecting surface.

26. Cutting body according to claim 16 wherein the connecting surface includes differently-shaped ridges and differently-shaped grooves.

27. Cutting body according to claim 16 wherein each ridge comprises ridge portions spaced along an extension of the ridge to define an interrupted ridge.

* * * * *